(12) United States Patent
Clayton et al.

(10) Patent No.: US 9,819,493 B2
(45) Date of Patent: Nov. 14, 2017

(54) ENHANCED SECURITY FOR MEDIA ENCRYPTION

(71) Applicants: Kevin Clayton, Irvine, CA (US); Peter Wilkes, Irvine, CA (US); Yuko Onishi, Irvine, CA (US); Raymond Campbell, Irvine, CA (US)

(72) Inventors: Kevin Clayton, Irvine, CA (US); Peter Wilkes, Irvine, CA (US); Yuko Onishi, Irvine, CA (US); Raymond Campbell, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 78 days.

(21) Appl. No.: 14/190,227

(22) Filed: Feb. 26, 2014

(65) Prior Publication Data
US 2015/0244529 A1    Aug. 27, 2015

(51) Int. Cl.
| | |
|---|---|
| H04L 29/06 | (2006.01) |
| H04L 9/32 | (2006.01) |
| H04L 9/06 | (2006.01) |
| G06F 21/53 | (2013.01) |
| G06F 21/78 | (2013.01) |

(52) U.S. Cl.
CPC ............ *H04L 9/3242* (2013.01); *G06F 21/53* (2013.01); *G06F 21/78* (2013.01); *H04L 9/0637* (2013.01); *H04L 63/0428* (2013.01)

(58) Field of Classification Search
CPC .................................. G06F 21/72; G06F 9/46
USPC ......................................................... 713/189
See application file for complete search history.

(56) References Cited

U.S. PATENT DOCUMENTS

| | | | | |
|---|---|---|---|---|
| 5,473,680 | A | * | 12/1995 | Porter ...................... 379/221.15 |
| 2006/0248310 | A1 | * | 11/2006 | Kavalam et al. ............... 712/11 |
| 2008/0282082 | A1 | * | 11/2008 | Uchida ......................... 713/153 |
| 2009/0089041 | A1 | * | 4/2009 | Irving ................. G06F 9/45504 |
| | | | | 703/26 |

(Continued)

OTHER PUBLICATIONS

Devigne, "Executing secured virtual machines within a manycore architecture", May 2016, Microprocessors and Microsystems, p. 21-35.*

*Primary Examiner* — Taghi Arani
*Assistant Examiner* — Gregory Lane
(74) *Attorney, Agent, or Firm* — Robert P. Marley

(57) ABSTRACT

Systems and methods for enhanced security of media are provided. Media security may be enhanced by improving the setup of encryption and/or decryption, by improving the performance of encryption and/or decryption, or by improving both. The calls related to enhanced security of media from an application in an emulated environment to a security module in the operating system hosting the emulated environment may be combined to reduce the overhead of accessing a security module. An application handling secure shell (SSH) communications may execute multiple calls to a cryptographic module in the host operating system. Because many calls to the cryptographic module during SSH communications follow patterns, two or more related calls may be combined into a single combined call to the cryptographic module. For example, a call to generate a server-to-client key and a call to generate a client-to-server key may be combined into a single call.

12 Claims, 7 Drawing Sheets

(56) References Cited

U.S. PATENT DOCUMENTS

| | | | |
|---|---|---|---|
| 2009/0113425 A1* | 4/2009 | Ports | G06F 9/4426 718/1 |
| 2011/0099625 A1* | 4/2011 | Thom et al. | 726/18 |
| 2011/0289520 A1* | 11/2011 | Grigoriev et al. | 719/331 |
| 2012/0137137 A1* | 5/2012 | Brickell et al. | 713/182 |
| 2014/0173596 A1* | 6/2014 | Ng | G06F 9/5072 718/1 |
| 2015/0100791 A1* | 4/2015 | Chen | G06F 12/1408 713/189 |
| 2015/0199515 A1* | 7/2015 | Qureshi | 726/22 |

* cited by examiner

ENHANCED SECURITY FOR MEDIA ENCRYPTION

The instant disclosure relates to emulated environments. More specifically, this disclosure relates to communications between the emulated environment and the host operating system to enhance security for media encryption and decryption.

BACKGROUND

The art of cryptanalysis has gradually become more sophisticated over time, and is beginning to pose a serious threat to the security of information. As a consequence, conventional systems for media encryption and decryption that have not progressed equally as fast as cryptanalysis have become more susceptible to security breaches. Security may be threatened at any level in a network, from the encryption, decryption and transfer of data, to the setup of an encryption or decryption scheme, to the applications executing in an emulated environment that make calls to security modules that perform security-related tasks. To combat the advances made by cryptanalysis, improvements in security and performance at every level are necessary.

One example of performance deficiencies is illustrated with reference to applications executing in an emulated environment that access modules in a host operating system through an interface. FIG. 1 is a block diagram illustrating a conventional application executing in a host operating system. An application 110 executes inside an emulated environment 108. To perform certain functions, such as when functions are performed in hardware, the emulated environment 108 accesses modules 104 in the host operating system 102 through an interface 106, including an interface component 106a in the emulated environment 108 and an interface component 106b in the operating system 102. The interface 106 provides translation services and acts as an intermediary between the emulated environment 108 and the modules 104 of the host operating system 102. The interface 106a in the emulated environment 108 communicates with the cooperating interface 106b in the operating system 102. The cooperating interface 106b in the operating system 102 then makes the calls on the modules 104.

Calls from the application 110 to the module 104, such as calls to setup encryption/decryption schemes or to encrypt/decrypt data, are costly in terms of execution speed and memory overhead, because of translation of the data to/from the format needed by the operating system 102 and to actually move the data from the emulated environment 108 to the modules 104. The increased delay and overhead in accessing the modules 104 through the interface 106 with each call can degrade performance of the application 110 within the emulated environment 108 and can cause the application 110 to become vulnerable to advanced security threats. Thus, in addition to improving media encryption/decryption security as discussed above, there is a need to reduce use of the interface 106 to improve performance and security of the application 110.

SUMMARY

According to one embodiment, a method for setting up secure media encryption in one call may include providing an interface for an application executing in an emulated environment of a host operating system, in which the application accesses a security module in the host operating system through calls to the interface. The method may further include identifying two or more related calls, from the application to the module, for setting up secure media encryption, in which the two or more related calls comprise at least two of a call to create a cryptography context, a call to randomly generate an encryption key, a call to compute a hash subkey, a call to store the computed hash subkey in the cryptography context, a call to compute an initialization vector, and a call to create a cipher instance, in which a cipher instance initialization vector is initialized to the computed initialization vector. The method may also include combining the two or more related calls into a single call, and executing the single combined call to the module of the host operating system to perform the two or more related calls.

According to another embodiment, a computer program product for setting up secure media encryption in one call may include a non-transitory computer-readable medium. The medium may include code to provide an interface for an application executing in an emulated environment of a host operating system, in which the application accesses a security module in the host operating system through calls to the interface. The medium may further include code to identify two or more related calls, from the application to the module, for setting up secure media encryption, in which the two or more related calls comprise at least two of a call to create a cryptography context, a call to randomly generate an encryption key, a call to compute a hash subkey, a call to store the computed hash subkey in the cryptography context, a call to compute an initialization vector, and a call to create a cipher instance, in which a cipher instance initialization vector is initialized to the computed initialization vector. The medium may also include code to combine the two or more related calls into a single call, and code to execute the single combined call to the module of the host operating system to perform the two or more related calls.

According to yet another embodiment, an apparatus for setting up secure media encryption in one call includes a processor and a memory coupled to the processor. The processor may be configured to provide an interface for an application executing in an emulated environment of a host operating system, in which the application accesses a security module in the host operating system through calls to the interface. The processor may be further configured to identify two or more related calls, from the application to the module, for setting up secure media encryption, in which the two or more related calls comprise at least two of a call to create a cryptography context, a call to randomly generate an encryption key, a call to compute a hash subkey, a call to store the computed hash subkey in the cryptography context, a call to compute an initialization vector, and a call to create a cipher instance, in which a cipher instance initialization vector is initialized to the computed initialization vector. The processor may also be configured to combine the two or more related calls into a single call, and to execute the single combined call to the module of the host operating system to perform the two or more related calls.

According to a further embodiment, a method for setting up secure media encryption in one call includes providing an interface for an application executing in an emulated environment of a host operating system, in which the application accesses a security module in the host operating system through calls to the interface. The method may also include identifying two or more related calls, from the application to the module, for setting up secure media encryption, in which the two or more related calls comprise at least two of a call to create a cryptography context, a call to randomly generate an encryption key, a call to compute a hash subkey, a call to create an advanced encryption standard in Galois Counter Mode (AES-GCM) cipher instance, and a call to store the AES-GCM cipher instance and the computed hash subkey in the cryptography context. The method may further include combining the two or more related calls into a single call, and executing the single combined call to the module of the host operating system to perform the two or more related calls.

According to another embodiment, an apparatus for setting up secure media encryption in one call includes a processor and a memory coupled to the processor. The processor may be configured to provide an interface for an application executing in an emulated environment of a host operating system, in which the application accesses a security module in the host operating system through calls to the interface. The processor may also be configured to identify two or more related calls, from the application to the module, for setting up secure media encryption, in which the two or more related calls comprise at least two of a call to create a cryptography context, a call to randomly generate an encryption key, a call to compute a hash subkey, a call to create an advanced encryption standard in Galois Counter Mode (AES-GCM) cipher instance, and a call to store the AES-GCM cipher instance and the computed hash subkey in the cryptography context. The processor may be further configured to combine the two or more related calls into a single call, and to execute the single combined call to the module of the host operating system to perform the two or more related calls.

According to yet another embodiment, a computer program product for setting up secure media encryption in one call includes a non-transitory computer-readable medium. The medium may include code to provide an interface for an application executing in an emulated environment of a host operating system, in which the application accesses a security module in the host operating system through calls to the interface. The medium may also include code to identify two or more related calls, from the application to the module, for setting up secure media encryption, in which the two or more related calls comprise at least two of a call to create a cryptography context, a call to randomly generate an encryption key, a call to compute a hash subkey, a call to create an advanced encryption standard in Galois Counter Mode (AES-GCM) cipher instance, and a call to store the AES-GCM cipher instance and the computed hash subkey in the cryptography context. The medium may further include code to combine the two or more related calls into a single call, and to execute the single combined call to the module of the host operating system to perform the two or more related calls.

According to an embodiment, a method for setting up secure media decryption in one call may include providing an interface for an application executing in an emulated environment of a host operating system, in which the application accesses a security module in the host operating system through calls to the interface. The method may further include identifying two or more related calls, from the application to the module, for setting up secure media decryption, in which the two or more related calls comprise at least two of a call to create a cryptography context, a call to decrypt an encrypted binary large object (BLOB) using a machine key to obtain an encryption key from the decrypted BLOB, a call to compute an initialization vector, a call to create a cipher instance, and a call to set an encryption key associated with the cipher instance to the obtained encryption key from the decrypted BLOB and an initialization vector associated with the cipher instance to the computed initialization vector. The method may also include combining the two or more related calls into a single call, and executing the single combined call to the module of the host operating system to perform the two or more related calls.

According to another embodiment, a computer program product for setting up secure media decryption in one call may include a non-transitory computer-readable medium. The medium may include code to provide an interface for an application executing in an emulated environment of a host operating system, in which the application accesses a security module in the host operating system through calls to the interface. The medium may further include code to identify two or more related calls, from the application to the module, for setting up secure media decryption, in which the two or more related calls comprise at least two of a call to create a cryptography context, a call to decrypt an encrypted binary large object (BLOB) using a machine key to obtain an encryption key from the decrypted BLOB, a call to compute an initialization vector, a call to create a cipher instance, and a call to set an encryption key associated with the cipher instance to the obtained encryption key from the decrypted BLOB and an initialization vector associated with the cipher instance to the computed initialization vector. The medium may also include code to combine the two or more related calls into a single call, and code to execute the single combined call to the module of the host operating system to perform the two or more related calls.

According to yet another embodiment, an apparatus for setting up secure media decryption in one call includes a processor and a memory coupled to the processor. The processor may be configured to provide an interface for an application executing in an emulated environment of a host operating system, in which the application accesses a security module in the host operating system through calls to the interface. The processor may be further configured to identify two or more related calls, from the application to the module, for setting up secure media decryption, in which the two or more related calls comprise at least two of a call to create a cryptography context, a call to decrypt an encrypted binary large object (BLOB) using a machine key to obtain an encryption key from the decrypted BLOB, a call to compute an initialization vector, a call to create a cipher instance, and a call to set an encryption key associated with the cipher instance to the obtained encryption key from the decrypted BLOB and an initialization vector associated with the cipher instance to the computed initialization vector. The processor may also be configured to combine the two or more related calls into a single call, and to execute the single combined call to the module of the host operating system to perform the two or more related calls.

In an embodiment, a method for secure media encryption in one call may include providing an interface for an application executing in an emulated environment of a host operating system, in which the application accesses a security module in the host operating system through calls to the interface. The method may further include identifying two or more related calls, from the application to the module, for secure media encryption, in which the two or more related calls comprise at least two of a call to randomly generate an initialization vector, a call to compute an encryption of data, a call to format a binary large object (BLOB), and a call to write the BLOB to the media. The method may also include combining the two or more related calls into a single call, and executing the single combined call to the module of the host operating system to perform the two or more related calls.

In a further embodiment, a computer program product for secure media encryption in one call may include a non-transitory computer-readable medium. The medium may include code to provide an interface for an application executing in an emulated environment of a host operating system, in which the application accesses a security module in the host operating system through calls to the interface. The medium may further include code to identify two or more related calls, from the application to the module, for secure media encryption, in which the two or more related calls comprise at least two of a call to randomly generate an initialization vector, a call to compute an encryption of data, a call to format a binary large object (BLOB), and a call to write the BLOB to the media. The medium may also include code to combine the two or more related calls into a single call, and code to execute the single combined call to the module of the host operating system to perform the two or more related calls.

In another embodiment, an apparatus for secure media encryption in one call includes a processor and a memory coupled to the processor. The processor may be configured to provide an interface for an application executing in an emulated environment of a host operating system, in which the application accesses a security module in the host operating system through calls to the interface. The processor may be further configured to identify two or more related calls, from the application to the module, for secure media encryption, in which the two or more related calls comprise at least two of a call to randomly generate an initialization vector, a call to compute an encryption of data, a call to format a binary large object (BLOB), and a call to write the BLOB to the media. The processor may also be configured to combine the two or more related calls into a single call, and to execute the single combined call to the module of the host operating system to perform the two or more related calls.

According to a further embodiment, a method for secure media decryption in one call may include providing an interface for an application executing in an emulated environment of a host operating system, in which the application accesses a security module in the host operating system through calls to the interface. The method may further include identifying two or more related calls, from the application to the module, for secure media decryption, in which the two or more related calls comprise at least two of a call to verify an encryption cipher used to encrypt data, a call to verify a hash associated with the encryption of the data, a tag value associated with the encryption of the data, and an initialization vector, and a call to decrypt the data using a decryption cipher. The method may also include combining the two or more related calls into a single call, and executing the single combined call to the module of the host operating system to perform the two or more related calls.

According to another embodiment, a computer program product for secure media decryption in one call may include a non-transitory computer-readable medium. The medium may include code to provide an interface for an application executing in an emulated environment of a host operating system, in which the application accesses a security module in the host operating system through calls to the interface. The medium may further include code to identify two or more related calls, from the application to the module, for secure media decryption, in which the two or more related calls comprise at least two of a call to verify an encryption cipher used to encrypt data, a call to verify a hash associated with the encryption of the data, a tag value associated with the encryption of the data, and an initialization vector, and a call to decrypt the data using a decryption cipher. The medium may also include code to combine the two or more related calls into a single call, and code to execute the single combined call to the module of the host operating system to perform the two or more related calls.

According to yet another embodiment, an apparatus for secure media decryption in one call includes a processor and a memory coupled to the processor. The processor may be configured to provide an interface for an application executing in an emulated environment of a host operating system, in which the application accesses a security module in the host operating system through calls to the interface. The processor may be further configured to identify two or more related calls, from the application to the module, for secure media decryption, in which the two or more related calls comprise at least two of a call to verify an encryption cipher used to encrypt data, a call to verify a hash associated with the encryption of the data, a tag value associated with the encryption of the data, and an initialization vector, and a call to decrypt the data using a decryption cipher. The processor may also be configured to combine the two or more related calls into a single call, and to execute the single combined call to the module of the host operating system to perform the two or more related calls.

According to one embodiment, a method for providing secure communications to an application in an emulated environment may include providing an interface for an application executing in an emulated environment of a host operating system, in which the application accesses a security module in the host operating system through calls to the interface. The method may also include identifying two or more related calls from the application to the module for processing data during secure shell communications. The two or more related calls may include at least one of a call to a CreateHash function, a call to a HashData function, and a call to a GetHashValue function. The method may further include combining the two or more related calls into a single call. The method may also include executing a single combined call to the module of the host operating system to perform the two or more related calls.

According to another embodiment, a computer program product for providing secure communications to an application in an emulated environment having a non-transitory computer-readable medium includes code to provide an interface for an application executing in an emulated environment of a host operating system, in which the application accesses a module in the host operating system through calls to the interface. The medium also includes code to identify two or more related calls from the application to the module for processing data during secure shell communications. The two or more related calls may include at least one of a call to a CreateHash function, a call to a HashData function, and a call to a GetHashValue function. The medium further includes code to combine the two or more related calls into a single call. The medium also includes code to execute a single combined call to the module of the host operating system to perform the two or more related calls.

According to yet another embodiment, an apparatus for providing secure communications to an application in an emulated environment includes a processor and a memory coupled to the processor. The processor is configured to provide an interface for an application executing in an emulated environment of a host operating system, in which the application accesses a module in the host operating system through calls to the interface. The processor is further configured to identify two or more related calls from the application to the module for processing data in secure shell communications. The two or more related calls may include at least one of a call to a CreateHash function, a call to a HashData function, and a call to a GetHashValue function. The processor is also configured to combine the two or more related calls into a single call. The processor is further configured to execute a single combined call to the module of the host operating system to perform the two or more related calls.

According to a further embodiment, a method for providing secure communications to an application in an emulated environment includes receiving a first call to a module located outside an emulated environment for processing data during a secure shell session. The method also includes receiving a second call to the module located outside the emulated environment for processing data during the secure shell session. The method further includes combining the first call and the second call in a combined call. The method also includes executing the combined call to the module located outside the emulated environment.

According to another embodiment, an apparatus for providing secure communications to an application in an emulated environment includes a host operating system including at least one module. The apparatus also includes an emulated environment executing in the host operating system. The apparatus further includes an interface between the emulated environment and the module. The interface translates calls from an application in the emulated environment to calls to the module in the host operating system. The interface combines a first call and a second call from the application into a single combined call to the module.

According to yet another embodiment, a computer program product for providing secure communications to an application in an emulated environment has a non-transitory computer-readable medium including code to process secure shell communications. The medium also includes code to receive a first call to a module located outside an emulated environment. The medium also includes code to receive a second call to the module located outside the emulated environment. The medium further includes code to combine the first call and the second call in a combined call. The medium also includes code to execute the combined call to the module located outside the emulated environment.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Security of media encryption and decryption may be enhanced by using a different initialization vector to encrypt/decrypt distinct sets of input data, such as distinct files encrypted to and decrypted from tape, CD, DVD, and the like. Security may also be enhanced by using a different initialization vector for distinct types of media, such as tape, CD, DVD, and the like. In some embodiments, the enhanced security of media encryption and decryption may be set up or performed with calls to a security module from an application.

Performance of an application in an emulated environment may be improved by reducing the number of calls to modules within a host operating system that the application accesses through an interface. Reducing the number of calls to the modules reduces the amount of delay experience by the application as a result of the interface. Thus, application performance may be improved. According to one embodiment, the number of calls to the modules of a host operating system may be reduced by combining calls for related functions.

Figure 1:
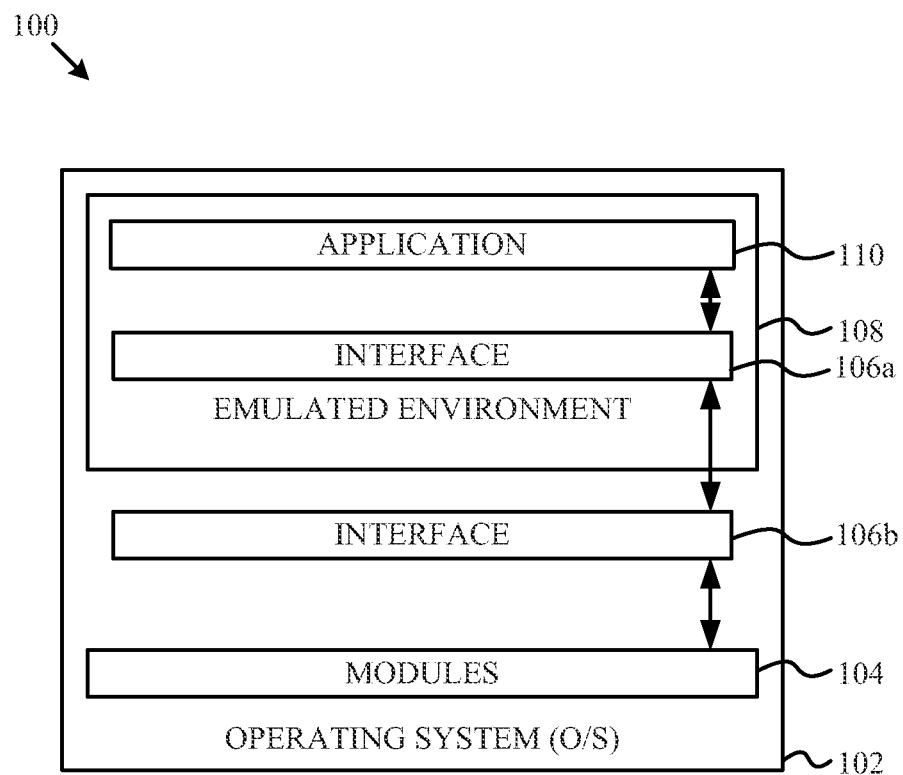
FIG. 1 is a block diagram illustrating a conventional application executing in a host operating system.
Figure 2:
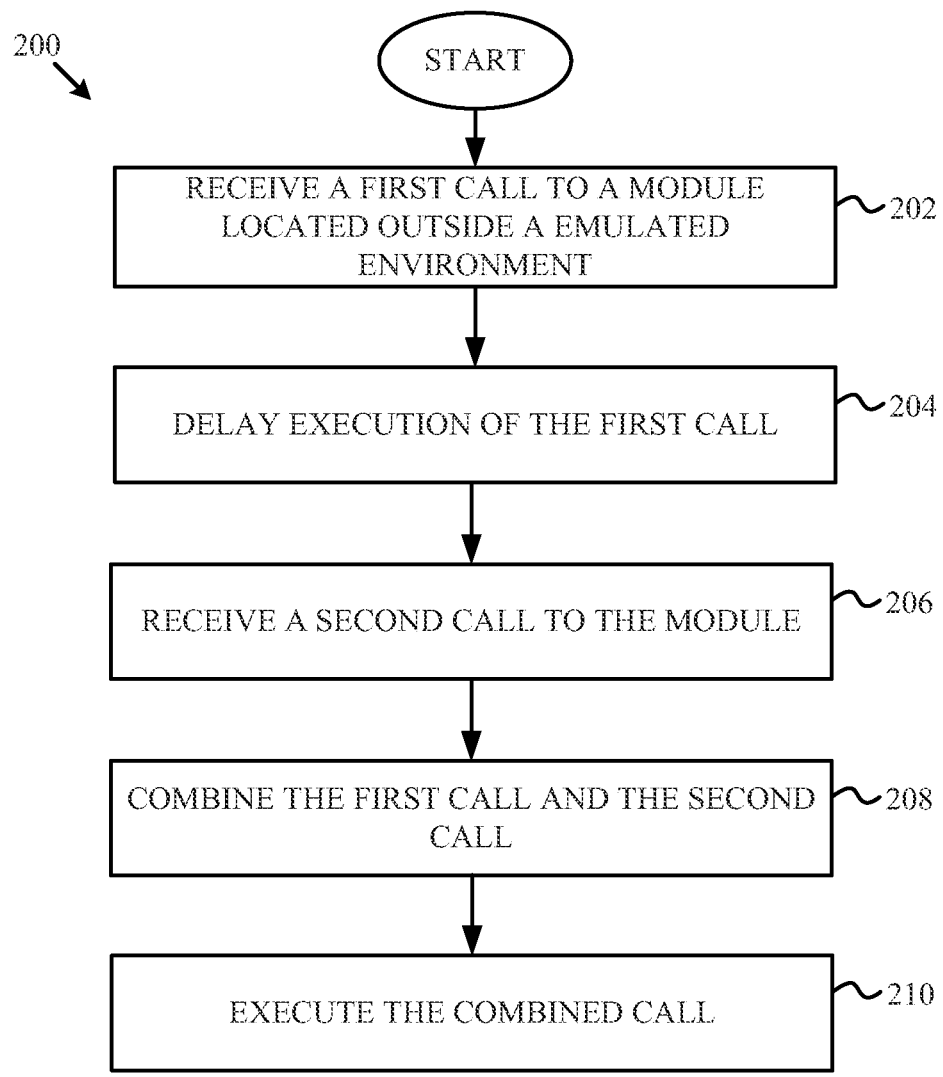
FIG. 2 is a flow chart illustrating an exemplary method for combining calls to modules through an interface according to one embodiment of the disclosure.

FIG. 2 is a flow chart illustrating an exemplary method for combining calls to modules through an interface according to one embodiment of the disclosure. A method 200 begins at block 202 with the emulated environment receiving a first call to a module located outside the emulated environment. At block 204, the emulated environment recognizes the first call as a call possibly having subsequent related calls, and the emulated environment delays execution of the first call. At block 206, a second call is received for the module located outside the emulated environment. At block 208, the first call and the second call are combined into a single combined call. At block 210, the combined call is executed. Thus, the number of calls to the module located outside the emulated environment is reduced by combining calls.

An emulated environment may have a table of calls used for determining when a first call may have a possible related second call at block 204. Alternatively, software executing in the emulated environment may have functions that issue two or more calls in a combined call. In this embodiment, there may be no delay in executing the first call while waiting for the second call to execute the combined call.

Figure 3:
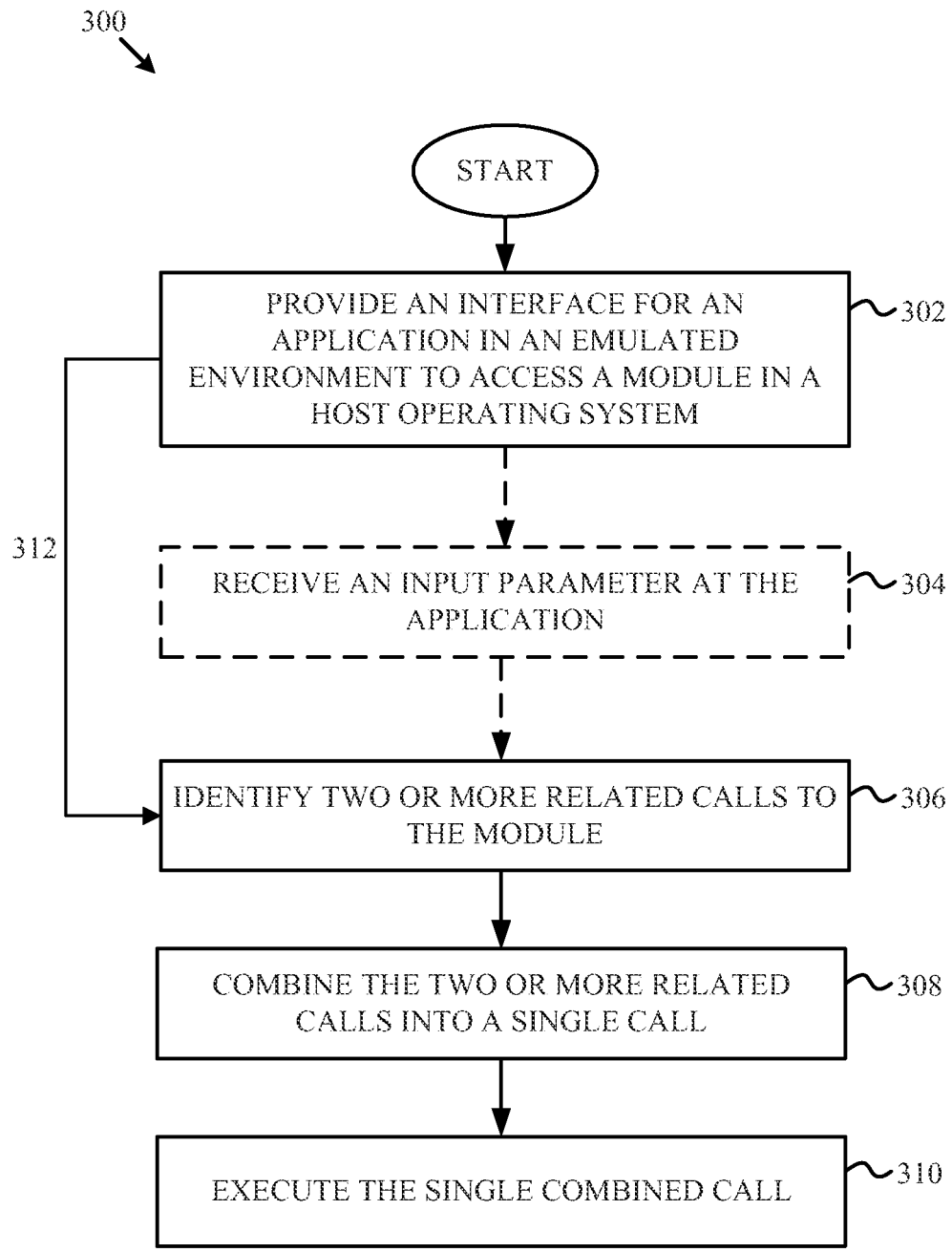
FIG. 3 is a flow chart illustrating an exemplary method for combining calls to modules through an interface according to another embodiment of the disclosure.

FIG. 3 is a flow chart illustrating an exemplary method for combining calls to modules through an interface according to another embodiment of the disclosure. A method 300 begins at block 302 with providing an interface for an application executing in an emulated environment to access a module in a host operating system. For example, in an embodiment, the application accesses a security module in the host operating system through calls to the interface. The method 300 may include, at block 304, the option of receiving an input parameter at the application. For example, in one embodiment, an input parameter may be received at block 304 that may be used by calls from an application to a module. According to another embodiment, an input parameter may not be received at block 304, in which case the method 300 may proceed from block 302 to block 306 via path 312. At block 306, two or more related calls to the module are identified, and the two or more related calls are combined into a single call at block 308. At block 310, the single combined call is executed by the module in the host operating system to perform the two or more related calls.

According to one embodiment, the module external to the emulated environment receiving the calls may be a cryptographic module. For example, when an application in the emulated environment is communicating through a secure shell (SSH) protocol, the application may make a number of calls to the cryptographic module for performing security-related tasks, such as generating keys and performing encryption. Certain calls to the cryptographic module are likely to be followed by certain other calls. The predictable order of calls to the cryptographic module may be used to combine calls to the cryptographic module. For example, calls to produce client-to-server keys are likely to be followed by calls to produce server-to-client keys. As another example, calls to generate a message authentication code (MAC) on a message are likely to be followed by a call to encrypt the message.

In one embodiment, the application executing in the emulated environment may be the Clear Path MCP and the host operating system may be Windows. When the Clear Path MCP system is processing SSH communication, the system may access a number of interfaces for processing calls to the cryptographic module of the host operating system. Each of the interfaces may combine multiple calls to the cryptographic module into a single combined call.

Figure 4:
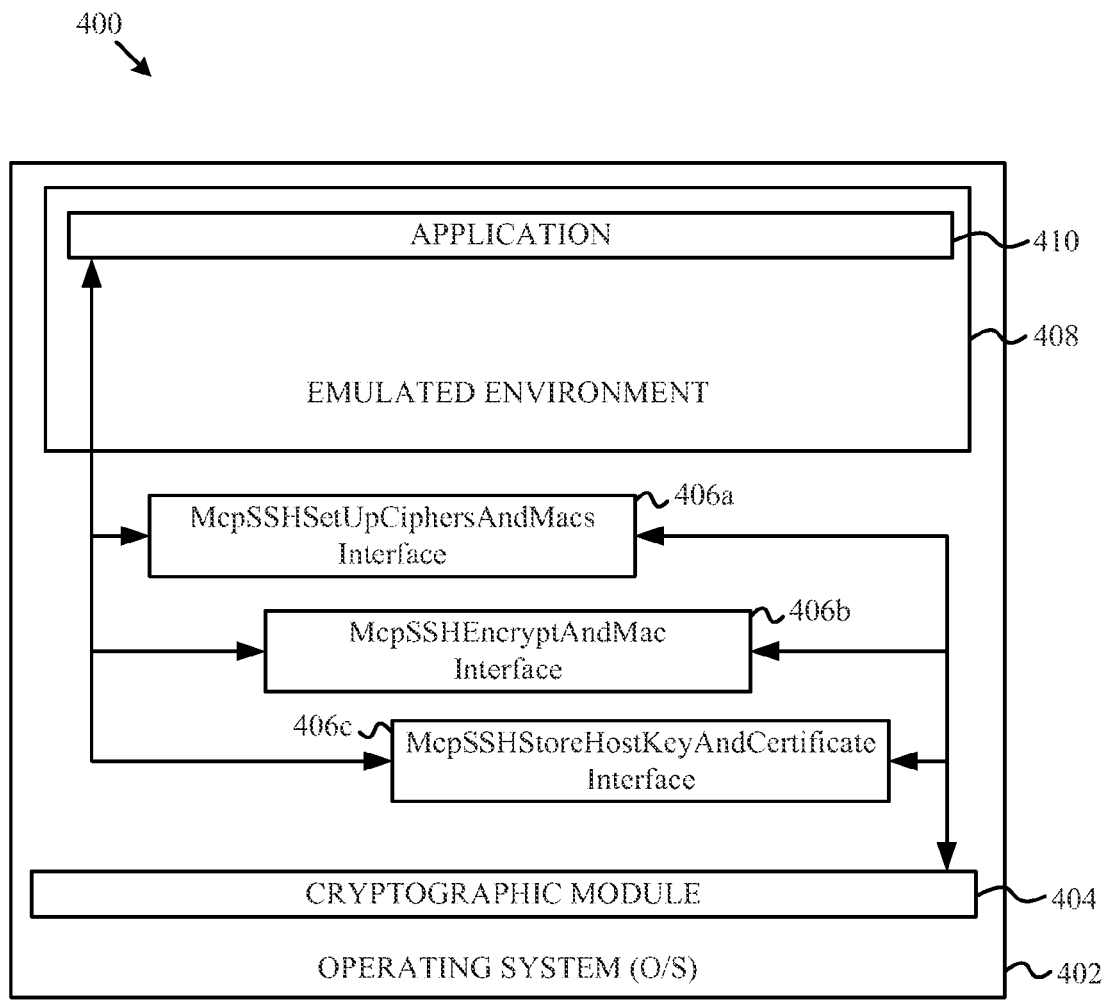
FIG. 4 is a block diagram illustrating multiple interfaces to a cryptographic module for combining calls according to one embodiment of the disclosure.

FIG. 4 is a block diagram illustrating multiple interfaces to a cryptographic module for combining calls according to one embodiment of the disclosure. An apparatus 400 includes a host operating system 402. An application 410 executes within an emulated environment 408 within the host operating system 402. A number of interfaces 406a-c are available to process calls between the application 410 and a cryptographic module 404. For example, each of the interfaces 406a-c may execute two or more related calls to the cryptographic module 404 while incurring the expense of only one call by combining the two or more related calls.

The interface 406a may be a McpSSHSetUpCiphersAndMacsInterface for combining calls related to setting up an SSH session. For example, the interface 406a may combine calls to CreateHash, HashData, GetHashValue, and CreateCipher functions. According to one embodiment, six calls may be combined to a single call. The six calls may include: a call on CreateHash, HashData, and GetHashValue to produce the initial client-to-server initialization vector (IV); a call on CreateHash, HashData, and GetHashValue to produce the initial server-to-client IV; a call on CreateHash, HashData, and GetHashValue to produce the client-to-server encryption key; a call on CreateHash, HashData, and GetHashValue to produce the server-to-client encryption key; a call on CreateHash, HashData, and GetHashValue to produce the client-to-server MAC key; and a call on CreateHash, Hashdata, and GetHashValue to produce the server-to-client MAC key.

The interface 406a may also combine calls to a CreateCipher function. For example, two calls may be combined into a single call including: a call to CreateCipher to create the client-to-server cipher using the client-to-server encryption key; and a call to CreateCipher to create the server-to-client cipher using the server-to-client encryption key.

In another example, the interface 406a may combine calls to a CreateHash function. For example, two calls may be combined into a single call including: a call to CreateHash to create a client-to-server MAC using the client-to-server MAC key; and a call to CreateHash to create a server-to-client MAC using the server-to-client MAC key.

The interface 406b may be a McpSSHEncryptAndMac interface for combining calls related to communications over the SSH protocol. For example, calls to an EncryptData function, a HashData function, and a GetHashValue function may be combined into a single call through the interface 406b.

The interface 406c may be a McpSSHStoreHostKeyAndCertificate interface for combining calls related to managing a communications session for the SSH protocol. For example, calls to an ImportPublicKey function, an OpenCertificateStore function, and a StoreCertificate function may be combined into a single call through the interface 406c.

Although not shown in FIG. 4, additional interfaces 406 may be provided between the application 410 and the cryptographic module 404 to execute other combinations of calls. For example, other interfaces may include: a McpCryptGenDHPublicValue interface for generating a Diffie-Hellman key; a McpCryptGenDHSharedSecret interface for generating shared secrets; a McpSSHHashAndSign interface for calculating a hash and a signature for a message; a McpSSHHashAndVerifySignature interface for generating an exchange hash and verifying the server's signature of the hash; and a McpSSHDecryptAndVerifyMac interface for decrypting and verifying a MAC.

Figure 5:
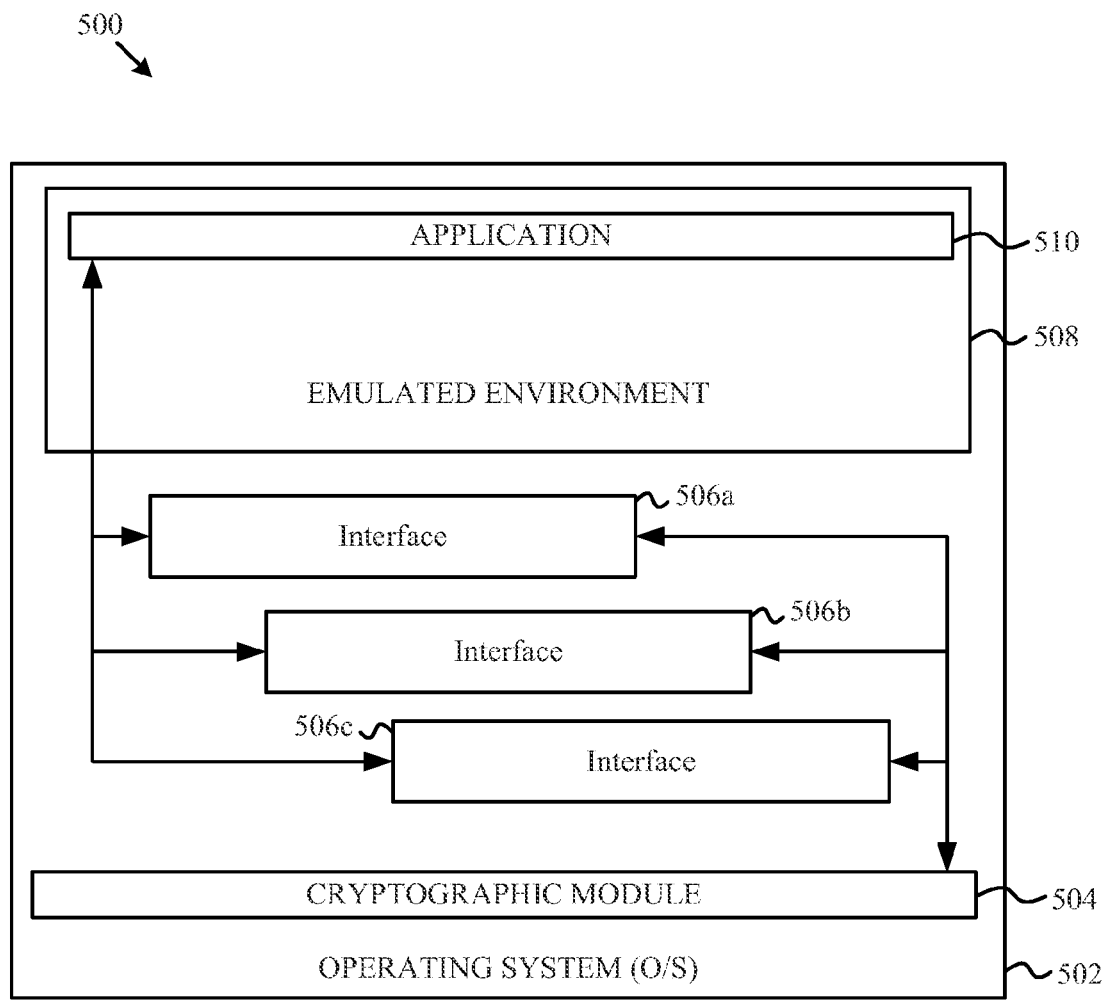
FIG. 5 is a block diagram illustrating more interfaces to a cryptographic module for combining calls according to one embodiment of the disclosure.

FIG. 5 is a block diagram illustrating more interfaces to a cryptographic module for combining calls according to another embodiment of the disclosure. An apparatus 500 may include a host operating system 502. An application 510 may execute within an emulated environment 508 within the host operating system 502. Interfaces 506a-506c may be available to process calls between the application 510 and a cryptographic module 504. For example, each of the interfaces 506a-506c may execute two or more related calls to the cryptographic module 504 by combining the two or more related calls. This may reduce the overhead in processing calls between the application 510 and the cryptographic module 504.

According to an embodiment, the interface 506a may be a McpTESetUpTapeEncryption interface for combining calls related to setting up secure media encryption. In some embodiments, the application 510 may receive an input parameter that identifies an initialization vector generation algorithm for setting up secure media encryption and/or decryption and/or for performing secure media encryption and/or decryption, and some of the combined calls related to secure media encryption and/or decryption may be associated or based, at least in part, on the received input parameter. For example, the interface 506a may combine at least two of six or more calls related to setting up secure media encryption into a single call. The calls may include: a call to create a cryptography context; a call to randomly generate an encryption key; a call to compute a hash subkey; a call to store the computed hash subkey in the cryptography context; a call to compute an initialization vector; and a call to create a cipher instance, in which a cipher instance initialization vector is initialized to the computed initialization vector. The call to randomly generate an encryption key and/or the call to compute an initialization vector may be based, at least in part, on the received input parameter. According to an embodiment, the cryptography context may include security data relevant to a connection and may contain information such as a communication session key and the duration of the communication session. In one embodiment, the cipher instance may be the cryptographic algorithm used to encrypt data, such as by transforming plaintext into ciphertext using an encryption key. In some embodiments, the cryptography context may store the cipher instance, a handle to the encryption key, and a handle to the hash subkey.

In another embodiment, the calls related to setting up secure media encryption that the interface 506a may combine into a single call may also include: a call to choose a machine key from a plurality of machine keys; a call to format a binary large object (BLOB); and a call to encrypt the BLOB using the chosen machine key. According to an embodiment, a machine key may be a key that identifies a particular server in a host operating system 502, and a plurality of machine keys may be used to differentiate servers within the host operating system 502. In one embodiment, the BLOB may be written to the media and may include information associated with at least one of a media encryption version, a BLOB version, the received input parameter, a length of the encryption key, the randomly generated encryption key, and a hash of other contents in the BLOB. In one embodiment, the entire BLOB, including the hash, may be encrypted before being written to the media.

According to an embodiment, the initialization vector generation algorithm identified by the input parameter may be one in which the initialization vector generation algorithm generates a different initialization vector for each distinct set of input data to be encrypted. In some embodiments, the initialization vector generation algorithm may be an encrypted salt-sector initialization vector (ESSIV) algorithm.

In another embodiment, the application 510 may also include functionality to identify the type or mode of encryption and/or decryption. For example, the application 510 may receive input from a user that identifies the type or mode of encryption and/or decryption or the application 510 may include internal logic that identifies the type or mode of encryption/decryption to be setup or performed. In one embodiment, the encryption/decryption mode may be identified to be a cipher-block chaining (CBC) encryption/decryption mode. The identification of the encryption/decryption mode to be setup or performed may also specify the type of initialization vector generation to use for encryption and/or decryption. For example, in one embodiment, the identified type of encryption/decryption may indicate that a single initialization vector be used for all input data to be encrypted/decrypted, while in another embodiment, the identified type of encryption/decryption may indicate that a different initialization vector should be generated for each distinct set of input data to be encrypted/decrypted. In some embodiments, an ESSIV algorithm may be used, as discussed above, by a cipher instance to generate a different initialization vector for each distinct set of input data to be encrypted/decrypted, while in other embodiments, the cipher instance may be an Advanced Encryption Standard in Galois Counter Mode (AES-GCM), which generates a different initialization vector for each distinct set of input data to be encrypted/decrypted. For ESSIV, the algorithm ID may be referred to as an input parameter to the application and it is mentioned as part of the BLOB contents. The same is true in the case of AES-GCM: the algorithm ID may be passed in as a parameter and is included in the BLOB. For example, according to another embodiment, the interface 506a may combine at least two of five or more calls related to setting up secure media encryption into a single call. The calls may include: a call to create a cryptography context; a call to randomly generate an encryption key; a call to compute a hash subkey; a call to create an AES-GCM cipher instance; and a call to store the AES-GCM cipher instance and the computed hash subkey in the cryptography context. In addition to storing the AES-GCM cipher instance, the cryptography context may also store a handle to the encryption key, and a handle to the hash subkey. The randomly generated encryption key may include a 256-bit AES key.

The calls related to setting up secure media encryption that the interface 506a may combine into a single call may also include: a call to choose a machine key from a plurality of machine keys; a call to format a BLOB; a call to compute a hash of the BLOB; a call to append the hash of the BLOB to the BLOB; and a call to encrypt the BLOB using the chosen machine key. The BLOB may be written to the media and may include information associated with at least one of a media encryption version, a BLOB version, a length of the encryption key, a hash of other contents in the BLOB, the received input parameter, and the randomly generated encryption key.

After the interface 506a executes two or more related calls to the cryptographic module 504 by combining two or more related calls, different values may be returned. For example, a machine key name, handles to the cryptography context, an encryption key, and/or a cipher may be returned.

Although not specified in FIG. 5, multiple interfaces, including interfaces 506a-506c and additional interfaces (not shown), may be provided between the application 510 and the cryptographic module 504 to execute a variety of combinations of calls. For example, interface 506a may be a McpTESetUpTapeEncryption interface for combining calls related to setting up secure media encryption, as discussed above. As another example, interface 506b may be a McpTESetUpTapeDecryption interface for combining calls related to setting up secure media decryption. For decryption, the interface 506b may combine at least two of five or more calls related to setting up secure media decryption into a single call. The calls may include: a call to create a cryptography context; a call to decrypt a BLOB using a machine key to obtain an encryption key from the decrypted BLOB; a call to compute an initialization vector; a call to create a cipher instance; and a call to set an encryption key associated with the cipher instance to the obtained encryption key from the decrypted BLOB and an initialization vector associated with the cipher instance to the computed initialization vector. Certain calls may be based, at least in part, on the received input parameter that identifies an initialization vector generation algorithm, such as the call to compute the initialization vector.

In another embodiment, interface 506c may be a McpCryptEncryptUpdateInPlace interface for combining calls related to securely encrypting media. For example, the interface 506c may combine at least two of four or more calls related to secure media encryption into a single call.

The calls may include: a call to randomly generate an initialization vector; a call to compute an encryption of data; a call to format a BLOB; and a call to write the BLOB to the media. In some embodiments, the encryption of data may be computed using an AES-GCM encryption cipher. The BLOB may include information associated with at least one of a media encryption version, a BLOB version, a length of the encrypted data, an input parameter that identifies an initialization vector generation algorithm, a tag value, an initialization vector, and the encrypted data. In other embodiments, the BLOB may also include information associated with a SHA-256 hash of the media encryption version, the BLOB version, the length of the encrypted data, the input parameter that identifies an initialization vector generation algorithm, and the initialization vector.

In yet another embodiment, an additional interface (not shown) to the interfaces 506a-c may be a McpCryptDecryptUpdateInPlace interface for combining calls related to securely decrypting media. For example, the interface may combine at least two of four or more calls related to secure media decryption into a single call. The calls may include: a call to verify an encryption cipher used to encrypt data; a call to verify a hash associated with the encryption of the data; a call to obtain a tag value associated with the encryption of the data and an initialization vector; and a call to decrypt the data using a decryption cipher. The encryption cipher used to encrypt the data may be identified to verify that it is an AES-GCM encryption cipher, and the decryption cipher may be used to decrypt the data may also be an AES-GCM decryption cipher. According to another embodiment, a tag value may be used to authenticate a message or some data. According to one embodiment, the application may also include functionality to read the encrypted data from media prior to identifying two or more related calls and/or to receive an error if the tag value associated with the encryption of the data indicates an authentication failure. In some embodiments, encryption, such as the encryption disclosed with reference to the McpCryptEncryptUpdateInPlace interface, and decryption may use additional authentication data to encrypt and decrypt. The additional authentication data may include the number of the input data being encrypted, the record or block number within the input being encrypted, and the name of the media. In one embodiment, the authenticated data is the tag value.

In some embodiments, an additional interface (not shown) to the interfaces 506a-c may be a McpCryptEncryptInitialize interface for combining calls related to initializing an encrypt cipher for a subsequent file on the media or a McpCryptDecryptInitialize interface for combining calls related to initializing a decrypt cipher for a subsequent file on the media.

Figure 6:
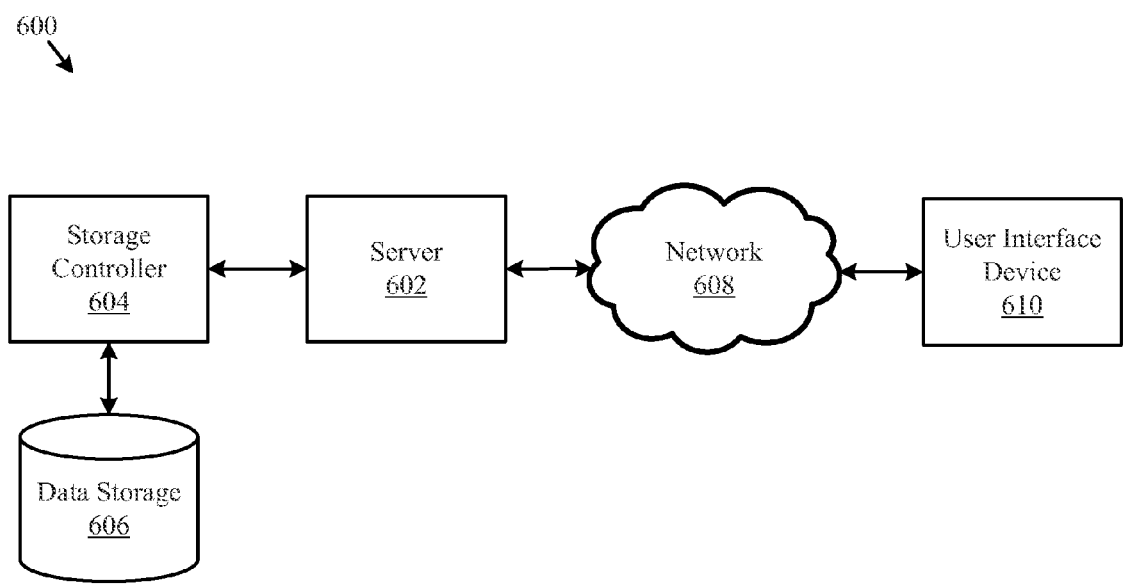
FIG. 6 is block diagram illustrating a computer network according to one embodiment of the disclosure.

FIG. 6 illustrates one embodiment of a system 600 for an information system, such as a system for executing programs in an emulated environment. The system 600 may include a server 602, a data storage device 606, a network 608, and a user interface device 610. The server 602 may be a dedicated server or one server in a cloud computing system. In a further embodiment, the system 600 may include a storage controller 604, or storage server configured to manage data communications between the data storage device 606 and the server 602 or other components in communication with the network 608. In an alternative embodiment, the storage controller 604 may be coupled to the network 608.

In one embodiment, the user interface device 610 is referred to broadly and is intended to encompass a suitable processor-based device such as a desktop computer, a laptop computer, a personal digital assistant (PDA) or tablet computer, a smartphone or other a mobile communication device having access to the network 608. When the device 610 is a mobile device, sensors (not shown), such as a camera or accelerometer, may be embedded in the device 610. When the device 610 is a desktop computer the sensors may be embedded in an attachment (not shown) to the device 610. In a further embodiment, the user interface device 610 may access the Internet or other wide area or local area network to access a web application or web service hosted by the server 602 and provide a user interface for enabling a user to enter or receive information.

The network 608 may facilitate communications of data, such as authentication information, between the server 602 and the user interface device 610. The network 608 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate, one with another.

In one embodiment, the user interface device 610 accesses the server 602 through an intermediate server (not shown). For example, in a cloud application the user interface device 610 may access an application server. The application server fulfills requests from the user interface device 610 by accessing a database management system (DBMS), which stores authentication information and associated action challenges. In this embodiment, the user interface device 610 may be a computer or phone executing a Java application making requests to a JBOSS server executing on a Linux server, which fulfills the requests by accessing a relational database management system (RDMS) on a mainframe server.

Figure 7:
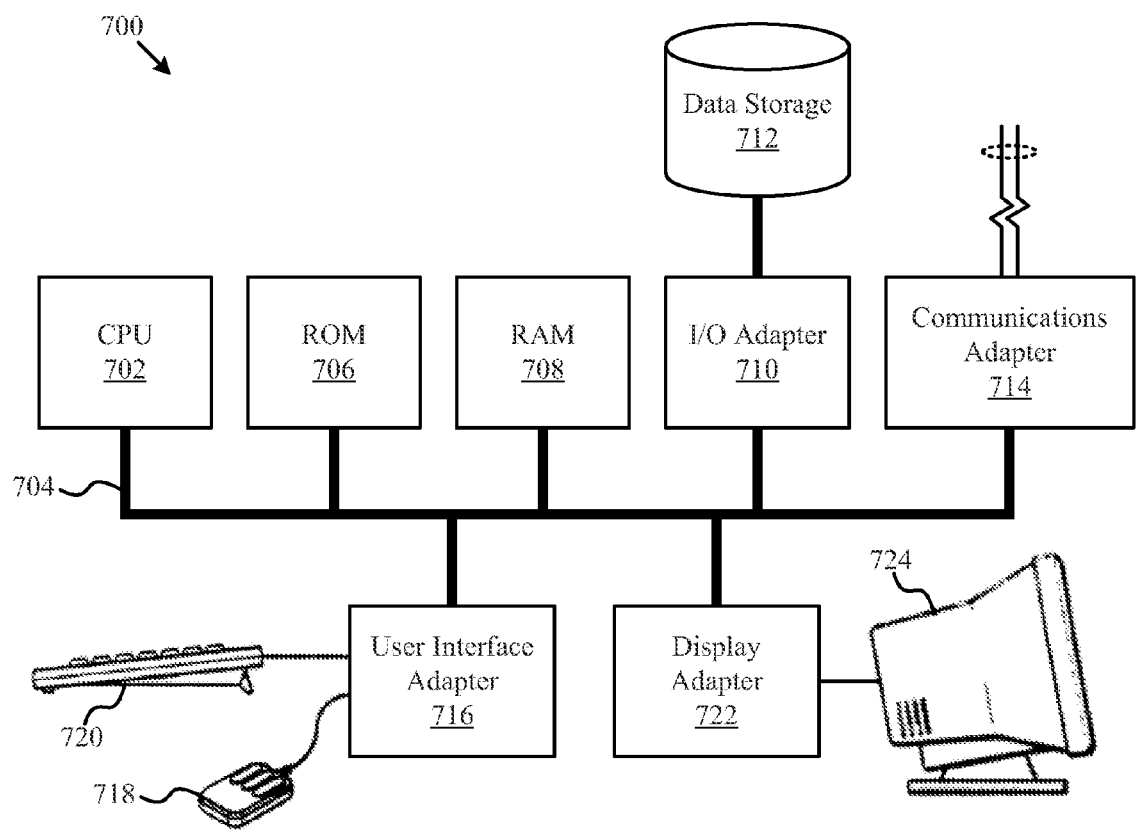
FIG. 7 is a block diagram illustrating a computer system according to one embodiment of the disclosure.

FIG. 7 illustrates a computer system 700 adapted according to certain embodiments of the server 602 and/or the user interface device 610. The central processing unit ("CPU") 702 is coupled to the system bus 704. The CPU 702 may be a general purpose CPU or microprocessor, graphics processing unit ("GPU"), and/or microcontroller. The present embodiments are not restricted by the architecture of the CPU 702 so long as the CPU 702, whether directly or indirectly, supports the modules and operations as described herein. The CPU 702 may execute the various logical instructions according to the present embodiments.

The computer system 700 also may include random access memory (RAM) 708, which may be synchronous RAM (SRAM), dynamic RAM (DRAM), and/or synchronous dynamic RAM (SDRAM). The computer system 700 may utilize RAM 708 to store the various data structures used by a software application. The computer system 700 may also include read only memory (ROM) 706 which may be PROM, EPROM, EEPROM, optical storage, or the like. The ROM may store configuration information for booting the computer system 700. The RAM 708 and the ROM 706 hold user and system data.

The computer system 700 may also include an input/output (I/O) adapter 710, a communications adapter 714, a user interface adapter 716, and a display adapter 722. The I/O adapter 710 and/or the user interface adapter 716 may, in certain embodiments, enable a user to interact with the computer system 700. In a further embodiment, the display adapter 722 may display a graphical user interface (GUI) associated with a software or web-based application on a display device 724, such as a monitor or touch screen.

The I/O adapter 710 may couple one or more storage devices 712, such as one or more of a hard drive, a flash drive, a compact disc (CD) drive, a floppy disk drive, and a tape drive, to the computer system 700. The communications adapter 714 may be adapted to couple the computer system 700 to the network 608, which may be one or more of a LAN, WAN, and/or the Internet. The communications adapter 714 may also be adapted to couple the computer system 700 to other networks such as a global positioning system (GPS) or a Bluetooth network. The user interface adapter 716 couples user input devices, such as a keyboard 720, a pointing device 718, and/or a touch screen (not shown) to the computer system 700. The keyboard 720 may be an on-screen keyboard displayed on a touch panel. Additional devices (not shown) such as a camera, microphone, video camera, accelerometer, compass, and or a gyroscope may be coupled to the user interface adapter 716. The display adapter 722 may be driven by the CPU 702 to control the display on the display device 724.

The applications of the present disclosure are not limited to the architecture of computer system 700. Rather the computer system 700 is provided as an example of one type of computing device that may be adapted to perform the functions of a server 602 and/or the user interface device 610. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for secure media encryption in one function call, comprising:
   providing an Interface for an application executing in an emulated environment of a host operating system, in which the application accesses a security module in the host operating system through function calls to the interface;
   identifying a type of encryption to be used to compute the encryption of data, wherein identifying the type of encryption indicates whether a different initialization vector should be generated for each input data to be encrypted;
   identifying two or more related function calls, from the application to the security module located outside of the emulated environment, for secure media encryption, in which the two or more related function calls comprise at least one of:
   a function call to randomly generate an initialization vector; a function call to compute an encryption of data; a function call to format a binary large object (BLOB); and
   a function call to write the BLOB to the secure media;
   combining the two or more related function calls into a single function call; and
   executing the single combined function call from the emulated environment to the security module of the host operating system located outside of the emulated environment to perform the two or more related function calls.

2. The method of claim 1, in which the encryption of data is computed using an advanced encryption standard in Galois Counter Mode (AES-GCM) encryption cipher.

3. The method of claim 1, in which the BLOB comprises information associated with at least one of:
   a media encryption version;
   a BLOB version;
   an input parameter that identifies an initialization vector generation algorithm;
   a tag value;
   an initialization vector;
   a length of the encrypted data;
   the encrypted data; and
   a hash of at least one of the above information.

4. The method of claim 1, in which the module comprises a cryptographic module.

5. A computer program product for secure media encryption in one function call, comprising:
   a non-transitory computer-readable medium comprising:
   code to provide an interface for an application executing in an emulated environment of a host operating system, in which the application accesses a security module in the host operating system through function calls to the interface;

code to identify a type of encryption to be used to compute the encryption of data, wherein identifying the type of encryption indicates whether a different initialization vector should be generated for each input data to be encrypted;

code to identify two or more related function calls, from the application to the security module located outside of the emulated environment, for secure media encryption, in which the two or more related function calls comprise at least one of:

a function call to randomly generate an initialization vector;

a function call to compute an encryption of data; a function call to format a binary large object (BLOB); and a function call to write the BLOB to the secure media; code to combine the two or more related function calls into a single function call; and code to execute the single combined function call from the emulated environment to the security module of the host operating system to perform the two or more related function calls located outside of the emulated environment.

6. The computer program product of claim 5, in which the encryption of data is computed using an advanced encryption standard in Galois Counter Mode (AES-GCM) encryption cipher.

7. The computer program product of claim 5, in which the BLOB comprises information associated with at least one of:

a media encryption version;

a BLOB version;

an input parameter that identifies an initialization vector generation algorithm;

a tag value;

an initialization vector;

a length of the encrypted data;

the encrypted data; and a hash of at least one of the above information.

8. The computer program product of claim 5, in which the module comprises a cryptographic module.

9. An apparatus for secure media encryption in one function call, comprising:

a processor; and a memory coupled to the processor, in which the processor is configured: to provide an interface for an application executing in an emulated environment of a host operating system, in which the application accesses a security module in the host operating system through function calls to the interface;

to identify a type of encryption to be used to compute the encryption of data, wherein identifying the type of encryption indicates whether a different initialization vector should be generated for each input data to be encrypted;

to identify two or more related function calls, from the application to the security module located outside of the emulated environment, for secure media encryption, in which the two or more related function calls comprise at least one of:

a function call to randomly generate an initialization vector; a function call to compute an encryption of data; a function call to format a binary large object (BLOB); and a function call to write the BLOB to the secure media; to combine the two or more related function calls into a single function call; and to execute the single combined function call from the emulated environment to the security module of the host operating system to perform the two or more related function calls located outside of the emulated environment.

10. The apparatus of claim 9, in which the encryption of data is computed using an advanced encryption standard in Galois Counter Mode (AES-GCM) encryption cipher.

11. The apparatus of claim 9, in which the BLOB comprises information associated with at least one of:

a media encryption version;

a BLOB version;

an input parameter that identifies an initialization vector generation algorithm;

a tag value;

an initialization vector;

a length of the encrypted data;

the encrypted data; and a hash of at least one of the above information.

12. The apparatus of claim 9, in which the module comprises a cryptographic module.

* * * * *